March 30, 1943.  W. L. GROENE  2,315,476
BROACHING MACHINE
Filed June 17, 1941
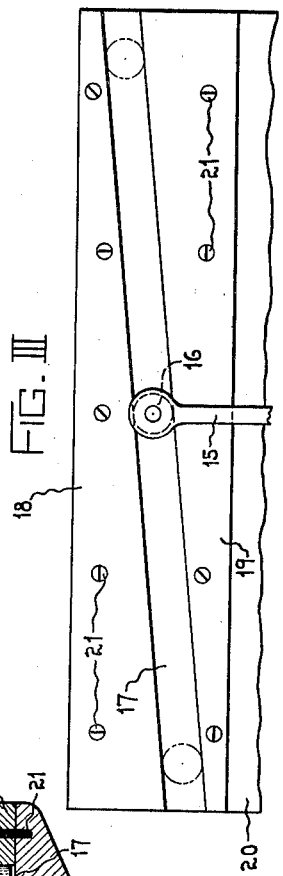
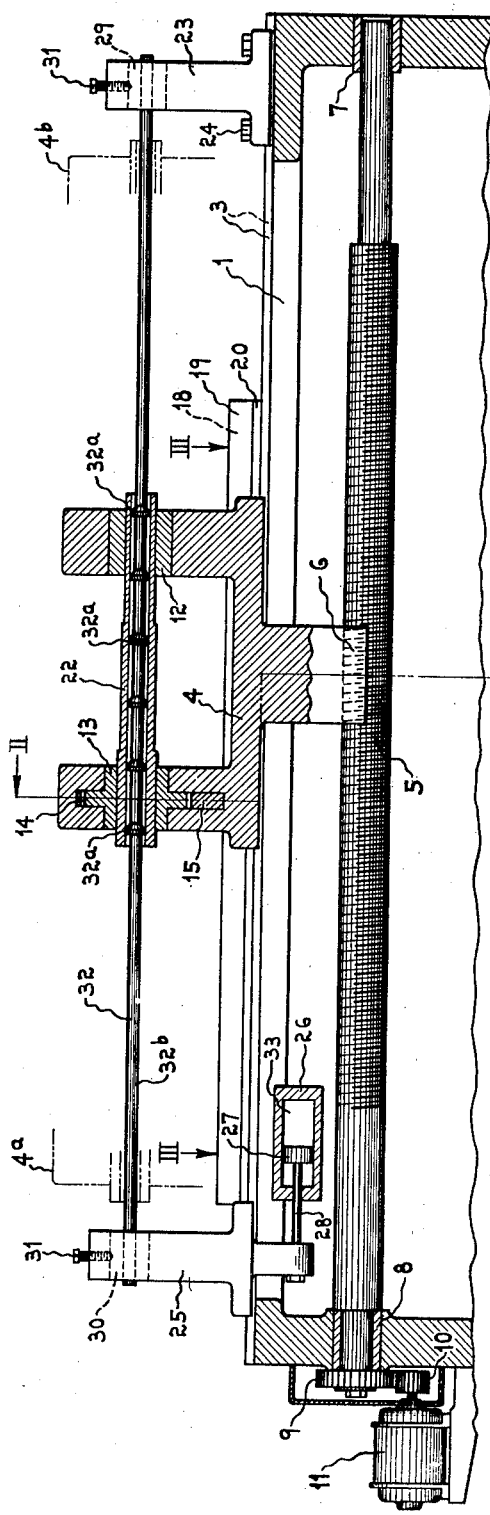
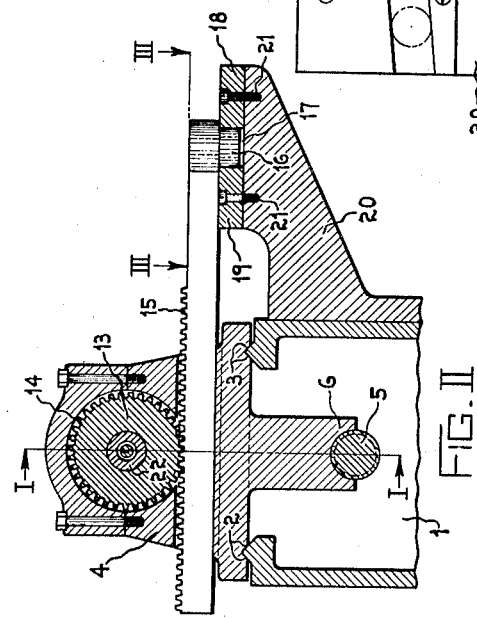
INVENTOR.
Willard L. Groene Patented Mar. 30, 1943

2,315,476

UNITED STATES PATENT OFFICE 2,315,476

BROACHING MACHINE

Willard L. Groene, Cincinnati, Ohio, assignor to
The R. K. Le Blond Machine Tool Company,
Cincinnati, Ohio, a corporation of Delaware Application June 17, 1941, Serial No. 398,457

5 Claims. (Cl. 90—28.1)

This invention pertains to improvements in broaching relatively long bores in tubes and guns and is particularly well adapted to the broaching of gun barrels both in preparing the initial bores and in machining the rifling grooves in such bores.

Heretofore, the difficult problem in broaching relatively long bores and rifling grooves in gun barrels has been that of providing a sufficiently heavy broaching bar which could push the cutters through the gun barrel, while at the same time having a sufficiently small bar to permit discharge of chips from the cutting edges of the broaching cutter, as they pass through the bore of the gun. The difficulty has been that the broach could not be adequately held properly against sidewise bending and distortion while still permitting sufficient room for the chips cut by the various broaching cutters mounted on the bar. It was therefore found necessary to resort to single cutter broaching arrangements on the end of the bar, which were pushed through the bore of the gun so that the chips would be ahead of the cutter and bar and prevent interference therewith, while at the same time providing a sufficiently heavy bar to push the single cutting broach through the gun barrel. Such a procedure, however, is costly and time consuming in that it requires the replacing of a cutter each time one has been passed through the gun with one of somewhat larger size until, after successively applying a large number of these cutters to the end of the broaching bar, the gun bore or rifling is finally brought to finished dimensions.

The object of the present invention however, is to avoid the use of the former single cutter push broaching arrangement and to utilize a series of cutters arranged on a broaching bar, which may be simultaneously fed through the bore of the gun, while at the same time providing a broaching bar of sufficiently small diameter to permit the chips to properly escape from the cutter without jamming the boring bar in the bore of the gun being machined. In order to do this, the broaching bar with the multiple cutters fixed thereon is mounted rigidly in such a way that it is held under tension or stretched during the time the work is passed longitudinally of the broach to bring the various cutters through the bore of the work to be machined. By thus tensioning or stretching the broach during the broaching operation, the sidewise distortion of the broach is minimized to a degree permitting a high degree of accuracy and finish in the bore of the work being broached, while at the same time providing a sufficiently small diameter broach shank to permit escape of chips from the cutting edges of the various broaching cutters mounted thereon.

Another object of the invention is to provide in a gun broaching or gun rifling machine, means for mounting a relatively long slender broach in the frame of the machine and to provide means for stretching this broach and maintaining it under tension while passing a work piece to be broached over the broach.

A further object is to provide in a gun rifle broaching machine means for mounting a broach on the frame of the machine and means for tensioning or holding the broach in stretched condition while passing the work to be broached over the cutters while slowly rotating said work piece to produce spiral rifling grooves in the gun barrel.

Further features and advantages of this invention will appear from the detailed description of the drawing in which:

Figure I is a diagrammatic longitudinal section through an exemplary machine embodying the principles of this invention, as shown on the line I—I of Figure II.

Figure II is a transverse section through the machine on the line II—II of Figure I, particularly showing the guide bar and rack pinion arrangement for effecting the slow rotation of the work holding device as it moves longitudinally of the frame of the machine to effect the spiral grooving of the bore of the gun when rifling broaching cutters are to be utilized.

Figure III is a fragmentary plan view of the form bar for actuating the rack and pinion mechanism for rotating the work holder as shown on the line III—III of Figures I and II.

The machine comprises a bed 1 upon the upper surface of which is provided suitable slide ways 2 and 3, Figure II, upon which is slidably mounted the work carriage 4, which is moved longitudinally of the bed ways 2 and 3 at feeding or rapid traversing movements by means of the screw 5 operating in the nut portion 6 of the carriage 4. This screw 5 is suitably journaled against axial movement in the bearings 7 and 8 in the bed 1 of the machine and is driven through appropriate transmission gearing 9 and 10 by the feed and rapid traversing motor 11.

In the work carriage 4 is provided rotatable work carrying spindles 12 and 13, the spindle 13 having a gear 14 which is actuated by a rack 15 slidably mounted transversely of the lathe in the carriage 4, as best shown in Figure II. The outer end of this rack 15 has a cam roller 16, which operates in a slot 17 formed by the cam bars 18 and 19, fixed to a bracket 20 on the bed 1 of the machine by suitable screws 21. In this way longitudinal movement of the carriage 4 along the ways 2 and 3 of the bed 1 causes the work spindle 13 and the spindle 12 connected to the work piece 22 carried therein to rotate at a predetermined rate relative to the rate of travel of the carriage 4 along the bed for effecting the spiral grooving of the rifling in a gun 22.

Fixed on the bed 1 is a broach supporting bracket 23 bolted to the ways 2 and 3 by suitable screws 24 and on the other end of the bed is a similar bracket 25 which is free to slide on the ways 2 and 3 of the bed and is moved thereon by means of a suitable hydraulic cylinder 26 fixed on the bed 1 of the machine and having its piston 27 and rod 28 connected to the bracket 25. In each of these brackets is provided a suitable clamping bush 29 and 30 which are rendered operative by the clamping screws 31 which each rigidly bind the end portions of the broaching tool 32. This broaching tool 32 may be provided with a series of broaching cutter portions 32a, adapted for broaching cylindrical holes or the rifling grooves in the gun 22 to be broached.

The operation of this arrangement is substantially as follows: The work piece 22, or gun barrel in this particular instance, is appropriately chucked in the work spindles 12 and 13, at which time the carriage 4 is moved to the left to the position 4a indicated in Figure I. The broaching tool 32 is then inserted with its end 32b projecting through the bore of the gun, its end portions being rigidly clamped by means of the set screws and the bushings 29 and 30 in the respective brackets 23 and 25. Fluid pressure is then applied in the chamber 33 of the cylinder 26 so as to urge the bracket 25 away from the bracket 23 and to thereby set up a tensioning or stretching action in the broaching tool 32 so as to minimize its tendency to bend sidewise under the influence of the cutting action of its cutter portions 32a in the gun barrel 22.

Pressure is maintained in this chamber 33 at all times as the carriage 4 is fed to the right from position 4a over the broaching cutter portions 32a to the position 4b, by actuation of the motor 11 and the screw 5 and the nut 6 of said carriage as described. At the completion of this cutting operation, pressure is released from the chamber 33 of the cylinder 26 and the broaching tool 32 removed from the bushings 29 and 30. The work is then removed from the work spindles 12 and 13. As mentioned, in instances where it is desired to effect the cutting of the rifling grooves in the gun barrel by this arrangement, it is merely necessary to provide the proper configuration for the cutters 32a on the broach 32 and move the carriage in the same way as described with the addition of the use of the control cam of Figure III for effecting the proper predetermined rotation of the work spindle 13 in relation to the movement of the carriage along the bed ways 2 and 3. In this way the broaching of a gun barrel bore may be effected in a single operation or movement of a gun over the broaching tool while said broaching cutter is held rigidly in tension or stretched condition by pressure applied in the chamber 33 of the cylinder 26.

Having thus fully set forth and described my invention what I claim as new and desire to secure by United States Letters Patent is:

1. In a broaching machine, a frame, a work holder on said frame for holding a tubular work piece in said work holder, a broach adapted to be presented through a bore in said work piece, means for rigidly supporting one end of said broach on said frame, means on said frame for gripping the other end of said broach, means for causing relative movement between said supporting means so as to hold said broach in tension when said supporting means are gripped on said broach, and means for effecting relative movement of said work holder and said broach.

2. In a broaching machine, a frame, a work support movable on said frame, means on said work support for supporting a tubular work piece, a relatively long broach arranged to be presented through the bore of said work piece, means fixed on said frame for supporting one end of said broach, means movable on said frame for supporting the other end of said broach, means for moving said second mentioned support when gripping said broach away from said first mentioned support when gripping said broach so as to hold said broach in tension, and means for moving said work support relative to said broach.

3. In a broaching machine, a frame, a work carrier movably mounted on said frame, means for moving said work carrier on said frame, a rotatable work spindle in said work carrier for chucking a work piece therein, a relatively long slender broach associated with said spindle, means for fixedly supporting one end of said broach on the frame of said machine, means for movably mounting the other end of said broach on said frame, and means for moving said movable broach supporting means when gripped on said broach away from said fixed broach supporting means when gripped on said broach while moving said work carrier.

4. In a gun barrel broaching machine, a frame, a work carrier movably mounted in said frame, means for actuating said work carrier in feeding movements, means for chucking a gun barrel in said work carrier, a broach associated with said work carrier for relative movement through the bore of said gun, means on said frame for fixedly supporting one end of said broach, means movably mounted on said frame, for supporting the other end of said broach, and means for moving said movable supporting means when gripped on said broach away from said fixed supporting means when gripped on said broach during relative movement of said gun barrel and said broach.

5. In a gun rifling machine, a frame, a work support movable on said frame having means for supporting a gun to be rifled, a broach for cutting the rifling grooves in said gun, means fixed on said frame for supporting one end of said broach, means movable on said frame for supporting the other end of said broach, means for moving said movable supporting member when connected to said broach away from said fixed supporting member when connected to said broach for putting said broach in tension, means for moving said work support relative to said broach to effect relative travel between the gun barrel and said broach, and means for rotating said gun barrel on said work support as it is fed relative to said broach.

WILLARD L. GROENE.